United States Patent
Provizor et al.

(10) Patent No.: US 9,619,336 B2
(45) Date of Patent: Apr. 11, 2017

(54) MANAGING PRODUCTION DATA

(71) Applicant: INTERNATIONAL BUSINESS MACHINES CORPORATION, Armonk, NY (US)

(72) Inventors: Limor Provizor, Lavon (IL); Michael Sternberg, Haifa (IL); Asaf Yeger, Kiryat-Tivon (IL)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 14/147,552

(22) Filed: Jan. 5, 2014

(65) Prior Publication Data

US 2015/0193311 A1 Jul. 9, 2015

(51) Int. Cl.
*G06F 17/30* (2006.01)
*G06F 11/14* (2006.01)
*G06F 12/02* (2006.01)

(52) U.S. Cl.
CPC .......... *G06F 11/1456* (2013.01); *G06F 12/02* (2013.01)

(58) Field of Classification Search
CPC ................................................ G06F 17/30088
See application file for complete search history.

(56) References Cited

U.S. PATENT DOCUMENTS

| | | | |
|---|---|---|---|
| 8,244,850 B1 | 8/2012 | Roussos et al. | |
| 8,402,309 B2 | 3/2013 | Timashev et al. | |
| 2005/0055603 A1* | 3/2005 | Soran | G06F 3/0608 714/6.32 |
| 2007/0055710 A1 | 3/2007 | Malkin | |
| 2008/0201391 A1* | 8/2008 | Arakawa | G06F 11/1471 |
| 2008/0270374 A1* | 10/2008 | Li | G06F 17/30495 |
| 2011/0276539 A1* | 11/2011 | Thiam | G06F 11/1448 707/634 |
| 2012/0011340 A1 | 1/2012 | Flynn et al. | |
| 2012/0151136 A1* | 6/2012 | Hay | G06F 11/1456 711/114 |
| 2013/0054910 A1 | 2/2013 | Vaghani et al. | |

(Continued)

OTHER PUBLICATIONS

Jack Fegreus, "Paragon starwInd ISCSI sans maximize performance and functionality for virtualized storage systems", Open Bench Labs, Feb. 2013, Can be found at : http://www.openbench.com/PDF/ParagonSAN.pdf.

(Continued)

*Primary Examiner* — Etienne Leroux
*Assistant Examiner* — Cindy Nguyen
(74) *Attorney, Agent, or Firm* — Matthew C. Zehrer

(57) ABSTRACT

Various embodiments for managing production data are described herein. In one example of a method for managing production data, the method can include allocating, via a processor, a first storage area to store production data for an external computing device. The method can also include receiving a write request comprising production data to be stored in the first storage area. In addition, the method can include detecting that the first storage area does not have available space to store the production data and allocating, via a processor, a second storage area to store the production data. Furthermore, the method can include transferring, via a processor, production data stored in the first storage area to a backup device.

20 Claims, 5 Drawing Sheets

(56) References Cited

U.S. PATENT DOCUMENTS

2014/0156956 A1* 6/2014 Ezra .................. G06F 3/065
　　　　　　　　　　　　　　　　　　　711/162

OTHER PUBLICATIONS

EMC2, "EMC vnxe ser es storage systems a detailed review", White Paper, Mar. 2012. Can be found at : http://www.emc.com/collateral/hardware/white-papers/h8178-vnxe-storage-systems-wp.pdf.
HP, "HP store virtual 4000 storage quick specs", Quick Specs, Version 11, May 2013. Can be found at : http://h18004,www1.hp.com/products/quickspecs/14437_div/14437_div.pdf.

* cited by examiner

200

MANAGING PRODUCTION DATA

BACKGROUND

The present invention relates to managing production data, and more specifically, to managing production data using a backup device.

SUMMARY

According to an embodiment described herein, a method can include allocating, via a processor, a first storage area to store production data for an external computing device. The method can also include receiving a write request comprising production data to be stored in the first storage area. In addition, the method can include detecting that the first storage area does not have available space to store the production data. Furthermore, the method can include allocating, via a processor, a second storage area to store the production data. Additionally, the method can include transferring, via a processor, production data stored in the first storage area to a backup device.

According to another embodiment described herein, a system can include a memory device comprising processor executable instructions and a processor. The processor can allocate a first storage area to store production data for an external computing device and receive a write request comprising production data to be stored in the first storage area. The processor can also detect that the first storage area does not have available space to store the production data. Furthermore, the processor can allocate a second storage area to store the production data, and transfer production data stored in the first storage area to a backup device.

In another embodiment described herein, a computer program product for managing production data can include a computer readable storage medium having program code embodied therewith. The program code when executed by a processing circuit can perform a method including allocating, by the processing circuit, a first storage area to store production data for an external computing device. The program code can also perform a method including receiving, by the processing circuit, a write request comprising production data to be stored in the first storage area. Furthermore, the program code can perform a method including detecting, by the processing circuit, that the first storage area does not have available space to store the production data. In addition, the program code can perform a method including allocating, by the processing circuit, a second storage area to store the production data, and transferring, by the processing circuit, production data stored in the first storage area to a backup device.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

According to embodiments of the present disclosure, a computing device can manage production data for an external computing device. In some examples, the computing device can store production data in snapshots (also referred to herein as storage areas). A snapshot, as referred to herein, can include any suitable amount of data corresponding to point-in-time copies of the data. For example, a snapshot may include the data written by any suitable number of applications executed by a computing device during a period of time. In some embodiments, the snapshot can be sent to a backup device, such as a storage device, among others. For example, different point-in-time copies of the same data may be stored in different snapshots that are stored on a backup device. In some embodiments, an external device can transmit production data to a separate computing device as if the separate computing device is internal storage for the external device. Production data, as referred to herein, can include any suitable data that is produced by executing instructions for applications, operating systems, or hardware components, among others.

Figure 1:
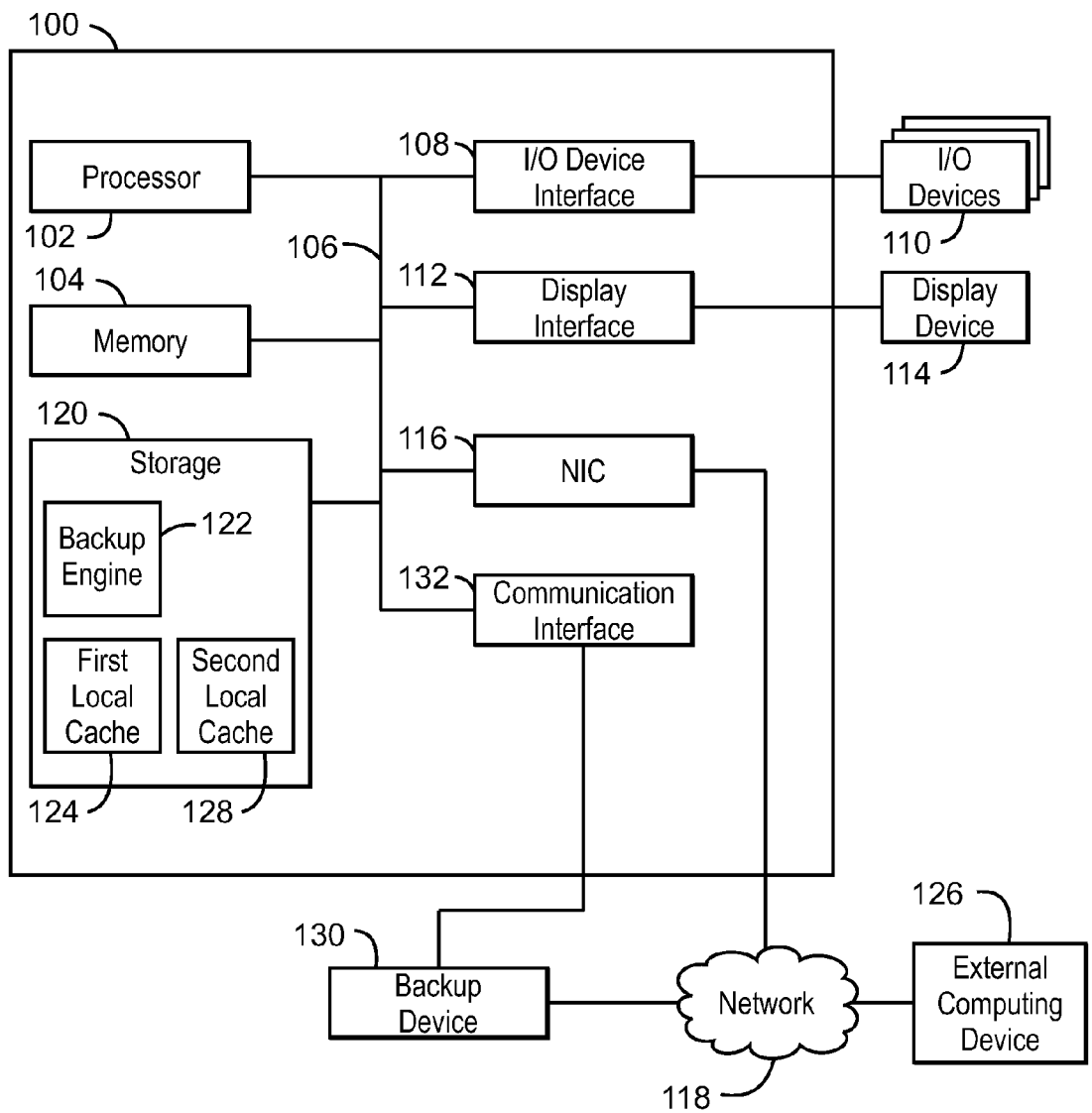
FIG. 1 is an example of a computing device that can manage production data.

FIG. 1 is an example of a computing device that can manage production data. The computing device 100 (also referred to herein as a local computing device) may be, for example, a computing phone, laptop computer, desktop computer, or tablet computer, among others. The computing device 100 may include a processor (also referred to herein as a processing circuit) 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can manage production data.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (also referred to herein as a NIC) 116 may be adapted to connect the computing device 100 through the system interconnect 106 to a network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others.

The processor 102 may also be linked through the system interconnect 106 to a storage device 120 that can include a hard drive, an optical drive, a USB flash drive, an array of drives, or any combinations thereof. The storage device 120 may include a backup engine 122 and a first local cache (also referred to herein as a first storage area) 124. In some embodiments, the backup engine 122 can receive production data from an external computing device 126 through the NIC 116. For example, the computing device 100 may receive production data from an external computing device 126 that corresponds to a write operation for any suitable application, operating system, or hardware component, among others. In some examples, the backup engine 122 can create a first local cache 124 to store the received production data corresponding to the write requests. The backup engine 122 can also return data from the first local cache 124 in response to read requests from the external computing device 126. In some embodiments, the amount of data stored in the first local cache 124 may exceed a predetermined threshold. The backup engine 122 may create a second local cache (also referred to herein as a second storage area) 128 and transfer the data from the first local cache 124 to a snapshot repository 130 (also referred to herein as a backup device). The snapshot repository 130 can store any suitable number of point-in-time copies of data written by the backup engine 122 to the first local cache 124. In some embodiments, the snapshot repository 130 may store any number of copies of the same data, wherein each copy represents the value of the data at a different time period. For example, the first local cache 124 stored in the snapshot repository 130 may include a value for data at a first time period. The data may be subsequently modified and the modified value may be stored in a second local cache 128 on the snapshot repository 130. Therefore, the backup engine 122 may track the changes to the values of data through multiple local caches stored in the snapshot repository 130.

In some embodiments, the external computing device 126 can communicate with the computing device 100 as if either the first local cache 124 or the second local cache 128 is a virtual disk within the external computing device 126. For example, the external computing device 126 may communicate with the computing device 100 through any suitable communication interface 132 using any suitable protocol, such as iSCI, among others. In some embodiments, the external computing device 126 may also communicate with the computing device 100 through the NIC 116 via the network 118.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the backup engine 122 may be partially, or entirely, implemented in hardware and/or in the processor 102. For example, the functionality may be implemented with an application specific integrated circuit, in the logic implemented in an I/O device 110, or logic implemented in an embedded controller, among others.

Figure 2:
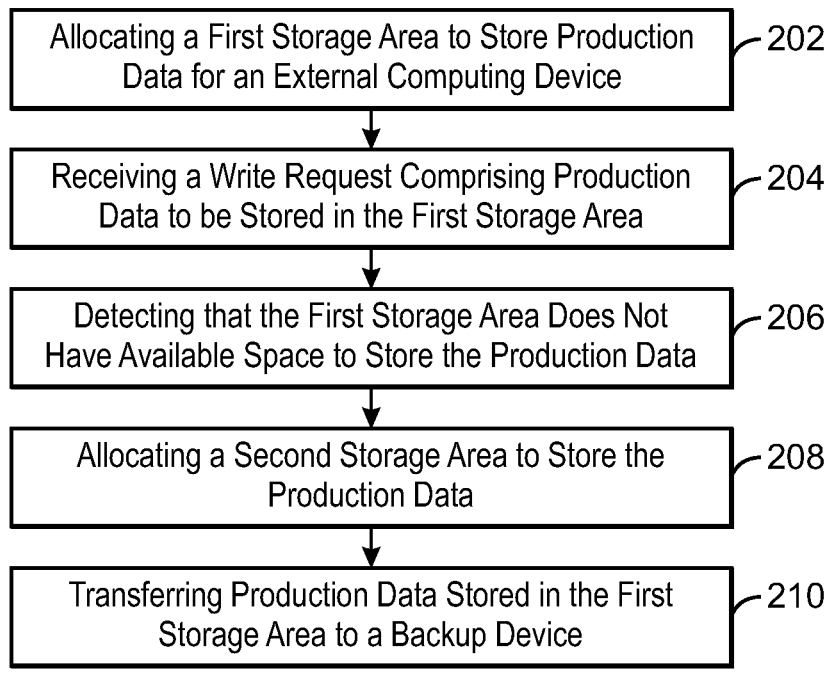
FIG. 2 is an example of a method that can manage production data including writing data to a backup device.

FIG. 2 is an example of a method that can manage production data including writing data to a backup device. The method 200 can be implemented with any suitable computing device, such as the computing device 100 of FIG. 1.

At block 202, the backup engine 122 can allocate a first storage area to store production data for an external computing device. As discussed above, the first storage area (also referred to herein as the first local cache 124) can store any suitable amount of production data below a threshold received from an external computing device. In some examples, the first storage area may include data space allocated in volatile memory devices, non-volatile memory devices, or any combination thereof within the computing device. In some embodiments, the first storage area can be any suitable partition, volume or file system.

At block 204, the backup engine 122 can receive a write request comprising production data to be stored in the first storage area. In some embodiments, the write request can include any output from write operations for production applications, operating system, or hardware components, among others within an external computing device.

At block 206, the backup engine 122 can detect that the first storage area does not have available space to store the production data. In some embodiments, the backup engine 122 may determine the available space of the first storage area by detecting the allocated size of the first storage area. In some examples, the allocated size of the first storage area can be determined by a predetermined threshold value. The allocated size of the first storage area can also be determined by a dynamic value. For example, the backup engine 122 may monitor the amount of production data stored in the first storage area over a period of time. In some examples, the backup engine 122 may allocate a larger amount of data space for subsequent storage areas. In some embodiments, the backup engine 122 can detect the amount of data previously stored in a storage area and determine that the storage area does not have available data space to store production data corresponding to a received write request.

At block 208, the backup engine 122 can allocate a second storage area to store the production data. In some embodiments, the backup engine 122 can allocate a second storage area based on a predetermined size or a dynamic size. For example, the backup engine 122 may allocate the second storage area based on an estimate that the second storage area can store production data from write requests for a period of time.

At block 210, the backup engine 122 can transfer production data stored in the first storage area to a backup device. In some embodiments, the backup device can include any suitable storage device such as a snapshot repository, among others. The backup device may store any suitable number of storage areas. For example, the backup device may store multiple storage areas with multiple point-in-time copies of data. As discussed above, the backup device may store any suitable number of copies of data at different points in time. In some embodiments, an external computing device can restore data written to a storage area by linking to a storage area that has been transferred to the backup device by the backup engine 122.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method 200 can also include restoring a storage area by returning a pointer to a previously allocated storage area transferred to the backup device. Furthermore, the method 200 may include determining that the transferring of production data stored in the first storage area to a backup device is complete and deleting the first storage area.

Figure 3:
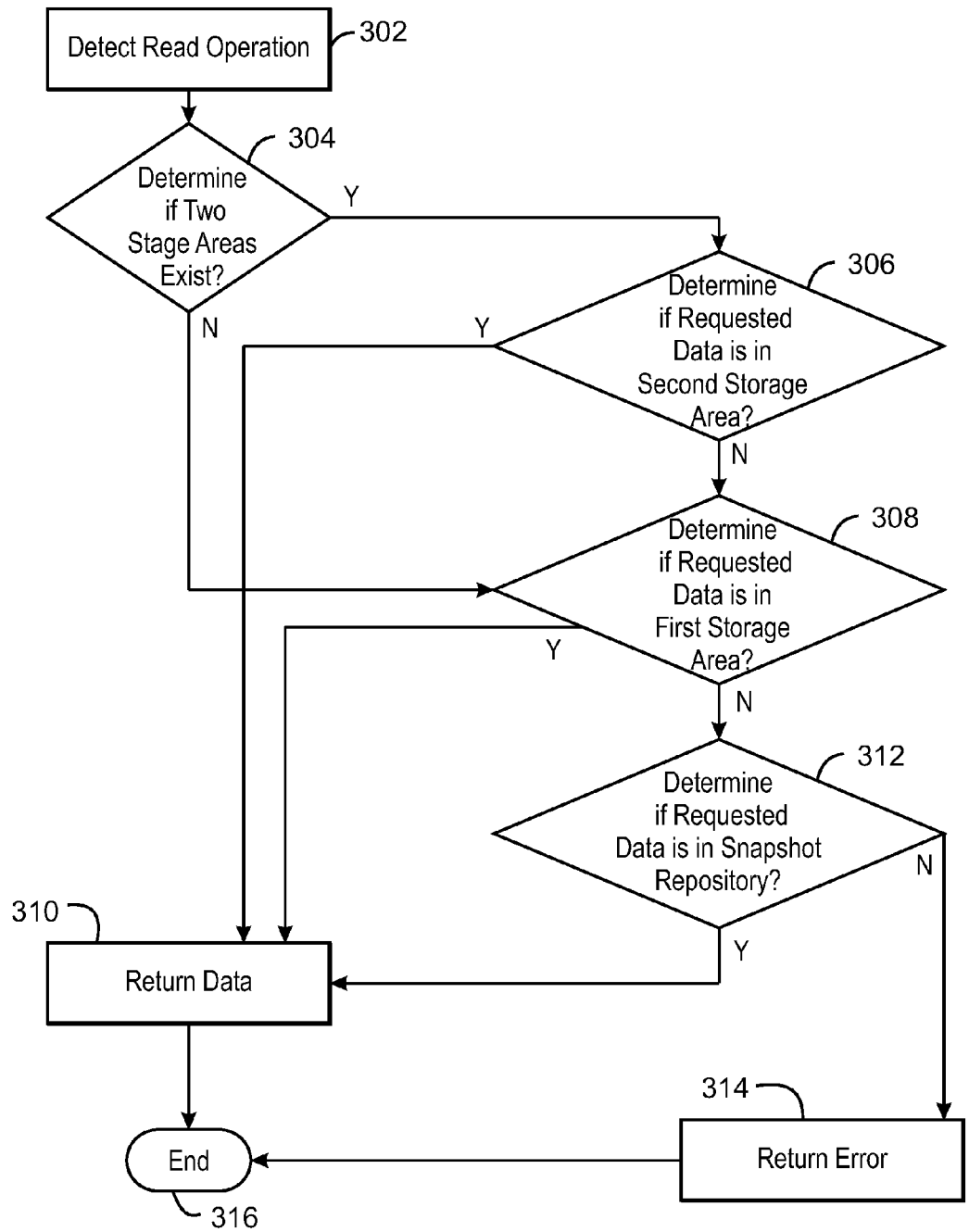
FIG. 3 is an example of a method that can manage production data including reading data from a backup device.

FIG. 3 is an example of a method that can manage production data including reading data from a backup device. The method 300 can be implemented with any suitable computing device, such as the computing device 100 of FIG. 1.

At block 302, the backup engine 122 can detect a read operation. In some embodiments, the read operation can indicate that the backup engine 122 is to return requested data to an external computing device. In some examples, the backup engine 122 may have return data that was previously written to a storage area in response to a write operation from the external computing device.

At block 304, the backup engine 122 can determine if two storage areas exist. In some embodiments, the backup engine 122 can create any suitable number of storage areas to store data received from an external computing device. In some examples, two storage areas may exist as the backup engine 122 transfers a first storage area to a backup device. As discussed above, a backup engine 122 may transfer data from a first storage area to a backup device when the available space in the first storage area is less than the amount of received production data to be stored. In some embodiments, the backup engine 122 can create a second storage area while the data from the first storage area is transferred to the backup device. If the backup engine 122 determines that two storage areas exist, the process flow continues at block 306. If the backup engine 122 determines that two storage areas do not exist, the process flow continues at block 308.

At block 306, the backup engine 122 can determine if requested data is stored in a second storage area. For example, the backup engine 122 may determine if the memory address associated with the requested data from the read operation matches the memory address of data stored in the second storage area. If the requested data is stored in the second storage area, the process flow continues at block 310. If the requested data is not stored in the second storage area, the process flow continues at block 308.

At block 308, the backup engine 122 can determine if requested data is stored in a first storage area. In some embodiments, previously received production data may be stored in the first storage area prior to the creation of the second storage area and prior to the transfer of the first storage area to a backup device. If the backup engine 122 determines that the requested data is stored in the first storage area, the process flow continues at block 310. If the backup engine 122 determines that the requested data is not stored in the first storage area, the process flow continues at block 312.

At block 312, the backup engine 122 can determine if the requested data is stored in a backup device such as a snapshot repository. As discussed above, a snapshot repository can store any suitable number of previously allocated storage areas. In some embodiments, the snapshot repository can return point-in-time copies of data from any suitable storage area that has been stored in the snapshot repository. If the backup engine 122 determines that the requested data is stored in the backup device, the process flow continues at block 310. If the backup engine 122 determines that the requested data is not stored in the backup device, the process flow continues at block 314.

At block 310, the backup engine 122 can return the requested data. In some embodiments, the backup engine 122 can return any suitable amount of requested data. The backup engine 122 can return the requested data using any suitable system interconnect, such as iSCI, among others. The process flow ends at block 316 after returning the requested data.

If the backup engine 122 determines that the requested data is not stored in the backup device at block 312, the process flow continues at block 314. At block 314, the backup engine 122 returns an error message to an external computing device that indicates the requested data is not stored in any storage area or backup device. The process ends at block 316 after returning the error message.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
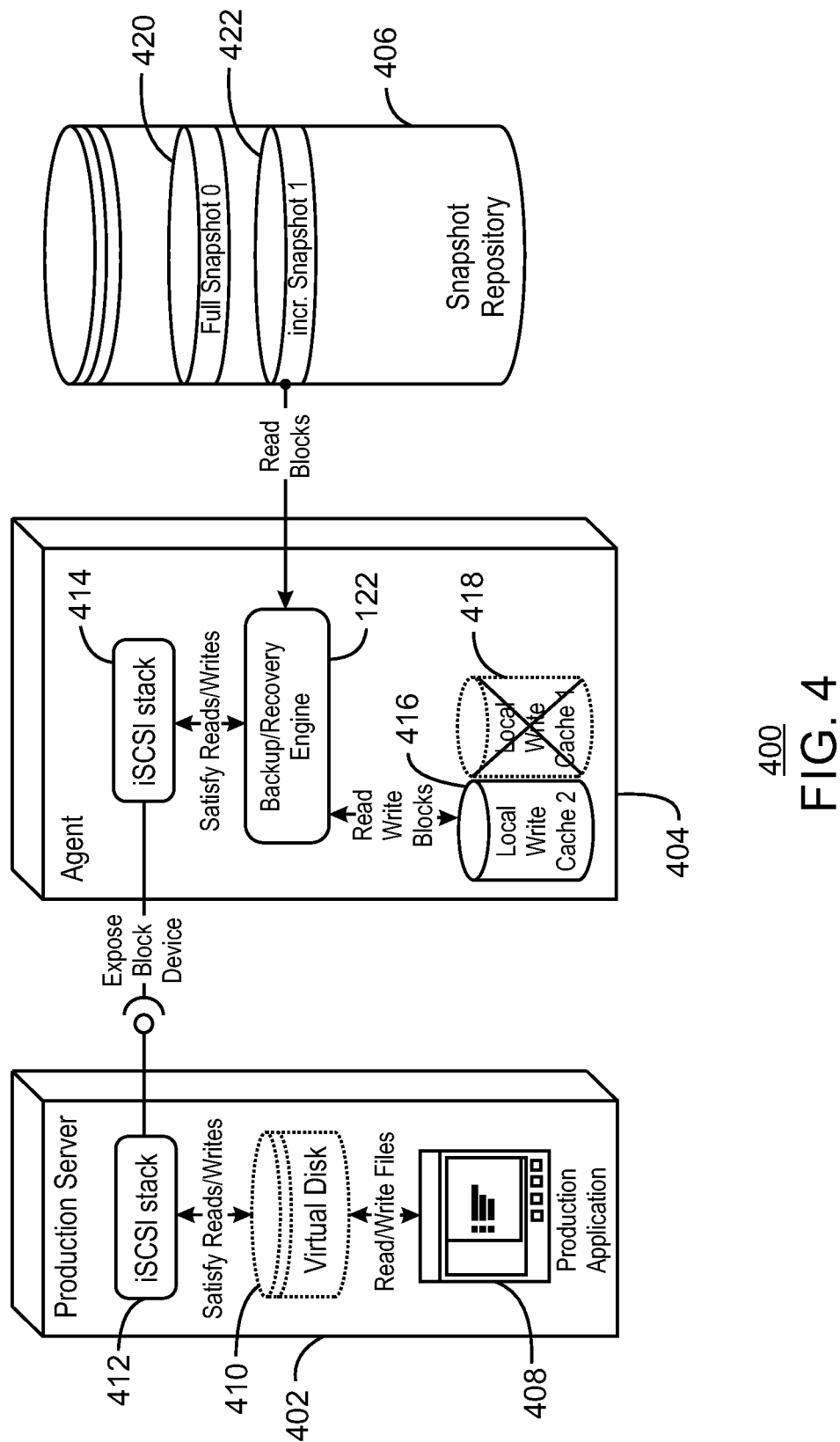
FIG. 4 is an example block diagram of a system for storing production data corresponding to an external computing device.

FIG. 4 is an example block diagram of a system for storing production data corresponding to an external computing device. The system includes a production sever 402, an agent 404, and a snapshot repository 406.

In some embodiments, the production server 402 (also referred to herein as an external computing device) can include a production application 408, a virtual disk 410, and an iSCI stack 412. In some examples, the production application 408 can generate read requests and write requests. The production application 408 can send the read requests and write requests to the virtual disk 410. In some embodiments, the virtual disk 410 can operate as a cache device that stores read requests and write requests for the iSCSI stack 412. The isSCSI stack can transmit the read requests and write requests to the agent 404 (also referred to herein as a local computing device). The agent 404 can include an iSCSI stack 414, a backup engine 122, and any suitable number of local write caches. In some embodiments, agent 404 may include one local write cache 416 if a second local write cache has not been created or if a previous local write cache has been transferred to the snapshot repository 406. For example, the local write cache 418 is illustrated with an X to indicate that the backup engine 122 has transferred the data from the local write cache 418 to the snapshot repository 406 and deleted the local write cache 418 from the agent 404.

In some embodiments, the snapshot repository 406 can include any suitable number of local write caches 416 and 418. In some examples, each local write cache 416 and 418 (also referred to herein as snapshots) can include any suitable number of point-in-time copies of data values. In some embodiments, the first local write cache transferred to the snapshot repository 406 can be referred to as a full snapshot 420. In some examples, subsequent local write caches transferred to the snapshot repository 406 can be referred to as incremental snapshots 422. As discussed above, a production application 408 may request data that the backup engine 122 has transferred to the snapshot repository 406. In some embodiments, the snapshot repository 406 can return the point-in-time copy of the requested data from an incremental snapshot 422 or a full snapshot 420. In some embodiments, the snapshot repository 406 may return the point-in-time copy of the requested data from the most recent incremental snapshot 422 that includes the requested data. In some examples, the snapshot repository 406 may receive a timestamp associated with the requested data and return the requested data from an incremental snapshot that corresponds to the timestamp.

In some embodiments, the production application 408 can also request a restore of a storage device. The production application 408 may send the restore request to the backup engine 122. The backup engine 122 may identify a previous local write cache that has been transferred to the snapshot repository 406. The backup engine 122 may also create an empty local write cache in the agent 404 and link the empty local write cache in the agent 404 to the identified snapshot stored in the snapshot repository 406. In some embodiments, the backup engine 122 can send files to a production application 408 by transferring the data blocks for the requested file stored in the snapshot repository 406. For example, the backup engine 122 may receive a request for a file-level restore and perform a file-level restore in response.

The illustration of FIG. 4 is intended only as an example of a system that can manage production data. In some embodiments, the agent 404 can store any suitable number of local cache writes 416 and 418. The snapshot repository 406 may also store any suitable number of full snapshots 420 and incremental snapshots 422. Furthermore, in some embodiments, the iSCSI stacks 412 and 414 can communicate using any suitable communication protocol.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
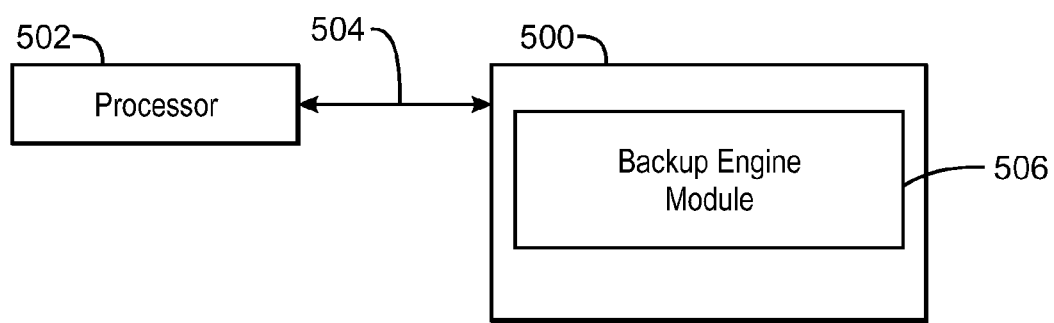
FIG. 5 is a block diagram depicting an example of a tangible, non-transitory computer-readable medium that can manage production data.

FIG. 5 is a block diagram depicting an example of a tangible, non-transitory computer-readable medium that can manage production data. The tangible, non-transitory, computer-readable medium 500 may be accessed by a processor (also referred to herein as a processing circuit) 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, a backup engine module 506 may be adapted to direct the processor 502 to manage production data. For example, the backup engine module 506 can detect requests for data and return requested data from any suitable number of local storage areas or a backup device. In some embodiments, the backup engine module 506 can also detect write requests and store data in a local storage area. It is to be understood that any number of additional software components not shown in FIG. 5 may be included within the tangible, non-transitory, computer-readable medium 500, depending on the specific application.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
   allocating, with a processor of a computing system, a first partition upon a storage device local to the computing system to store first production data of an external computing device external to the computing system;
   storing, with the processor of the computing system, the first production data in the first partition;
   receiving, with the processor of the computing system, a write request comprising second production data of the external computing device to be stored in the first partition, wherein the second production data is at least partially modified relative to the first production data;
   detecting, with the processor of the computing system, that the first partition does not have available space to store the second production data;
   allocating, via the processor of the computing system, a second partition upon the storage device to store the second production data;
   storing, via the processor of the computing system, the second production data in the second partition;
   transferring, with the processor of the computing system, the first production data stored in the first partition to a backup device external to the computing system;
   determining, with the processor of the computing system, that the transferring the first production data to the backup device is complete;
   deleting, with the processor of the computing system, the first partition;
   receiving, at the backup device, a read request corresponding to the first production data and returning from the backup device the first production data; and
   receiving, with the processor of the computing system, a read request corresponding to the second production data and returning from the processor of the computing system the first production data.

2. The method of claim 1, comprising:
   receiving a request for a file-level restore; and
   transferring data blocks for the request for the file-level restore from the backup device.

3. The method of claim 1, wherein the backup device is a snapshot repository.

4. The method of claim 1, wherein the backup device stores point-in-time copies of the first production data or the second production data.

5. The method of claim 1, further comprising:
   transferring, via a the processor, the second production data stored in the second partition to the backup device external to the computing system, wherein the first production data and the second production data within the backup device represents respective values of production data of the external computing device at different time periods.

6. The method of claim 1, wherein allocating the first partition comprises allocating, by the processor of the computing system, a first data space of the storage device to the first partition, wherein allocating the second partition comprises allocating, by the processor of the computing system, a second data space of the storage device to the second partition, and wherein the second data space is larger than the first data space.

7. The method of claim 6, wherein deleting the first partition comprises de-allocating the first data space of the first data space.

8. A computing system comprising:
   a memory device comprising processor executable instructions; and
   a processor configured to:
      allocate a first partition upon a storage device local to the computing system to store first production data of an external computing device external to the computing system;
      store the first production data in the first partition;
      receive a write request comprising second production data of the external computing device to be stored in the first partition, wherein the second production data is at least partially modified relative to the first production data;
      detect that the first partition does not have available space to store the second production data;

allocate a second partition upon the storage device to store the second production data;
store the second production data in the second partition;
transfer the first production data stored in the first partition to a backup device external to the computing system;
determine that the transfer of first production data to the backup device is complete;
delete the first partition;
receive a read request corresponding to the first production data and return from the backup device the first production data; and
receive a read request corresponding to the second production data and return from the processor the first production data.

9. The system of claim 8, wherein the processor is further configured to:
receive a request for a file-level restore; and
transfer data blocks for the request for the file-level restore from the backup device.

10. The system of claim 8, wherein the backup device is a snapshot repository.

11. The system of claim 8, wherein the backup device stores point-in-time copies of the first production data or the second production data.

12. The computing system of claim 8, wherein the processor is further configured to transfer the second production data stored in the second partition to the backup device external to the computing system and wherein the first production data and the second production data within the backup device represents respective values of production data of the external computing device at different time periods.

13. The computing system of claim 8, wherein the processor allocates more data space of the storage device to the second partition relative to data space of the storage device the processor allocates to the first partition.

14. The computing system of claim 13, wherein the processor being configured to delete the first partition comprises the processor de-allocating the data space of the storage device previously allocated the first partition.

15. A computer program product for managing production data, the computer program product comprising a non-transitory computer readable storage medium having program code embodied therewith, the program code executable by a processing circuit of a computing system to:
allocate, with the processing circuit, a first partition upon a storage device local to the computing system to store first production data of an external computing device external to the computing system;
store, with the processing circuit, the first production data to the first partition;
receive, with the processing circuit, a write request comprising second production data of the external computing device to be stored in the first partition, the second production data is at least partially modified relative to the first production data;
detect, with the processing circuit, that the first partition does not have available space to store the second production data;
allocate, with the processing circuit, a second partition to store the second production data;
store, with the processing circuit, the second production data in the second partition;
transfer, with the processing circuit, the first production data stored in the first partition to a backup device external to the computing system;
determine, with the processing circuit, the transfer of the first production data to the backup device is complete;
delete, with the processing circuit, the first partition;
receive, with the processing circuit, a read request corresponding to the first production data and return from the backup device the first production data; and
receive, with the processing circuit, a read request corresponding to the second production data and return from the processing circuit the first production data.

16. The computer program product of claim 15, wherein the program code is further executable to:
receive, with the processing circuit, a request for a file-level restore; and
transfer, with the processing circuit, data blocks for the request for the file-level restore from the backup device.

17. The computer program product of claim 15, wherein the backup device stores point-in-time copies of the first production data or the second production data.

18. The computer program product of claim 15, wherein the program code is further executable to:
transfer, with the processing circuit, the second production data stored in the second partition to the backup device external to the computing system, wherein the first production data and the second production data within the backup device represents respective values of production data of the external computing device at different time periods.

19. The computer program product of claim 15, wherein the processing circuit allocates more data space of the storage device to the second partition relative to data space of the storage device the processing circuit allocates to the first partition.

20. The computer program product of claim 19, wherein the program code which is executable to delete the first partition is further executable by the processing circuit of a computing system to de-allocate the data space of the storage device previously allocated the first partition.

* * * * *